March 21, 1933. J. B. DIXON ET AL 1,901,901
TESTING OF ELECTRICAL CONTACTS
Filed Nov. 21, 1928
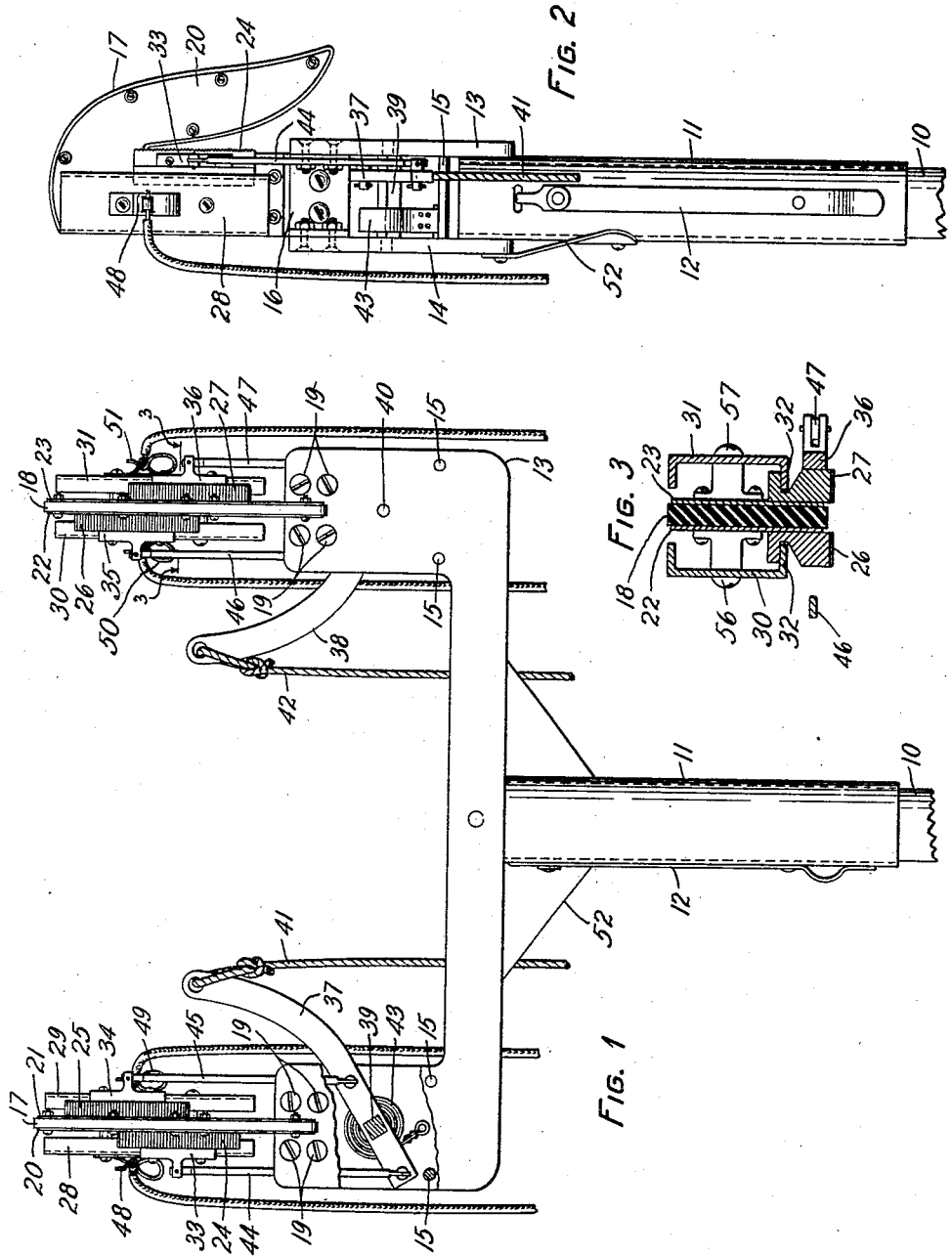
INVENTORS
J. B. DIXON
E. M. HONAN
BY
ATTORNEY Patented Mar. 21, 1933

1,901,901

UNITED STATES PATENT OFFICE

JOHN B. DIXON, OF RED BANK, AND EDWARD M. HONAN, OF WEST ORANGE, NEW JERSEY, ASSIGNORS TO BELL TELEPHONE LABORATORIES, INCORPORATED, OF NEW YORK, N. Y., A CORPORATION OF NEW YORK

TESTING OF ELECTRICAL CONTACTS

Application filed November 21, 1928. Serial No. 320,785.

This invention relates to the testing of electrical contacts and more particularly to testing the resistance of joints in open wire lines.

In measuring the resistance of joints in open wire lines to determine whether or not the joint is defective, it has been customary to provide a device adapted to make electrical contact on opposite sides of the joint and then by means of a suitable measuring apparatus to determine the conductivity of that portion of line between the contacts. These devices, however, are not entirely satisfactory since in many instances incorrect readings have been obtained due to poor contact between the device and the wire rather than to a defective joint. Furthermore, in many instances, these devices remove an excess of material from the line when establishing contact thus seriously affecting the mechanical strength and electrical conductivity of the line.

An object of this invention is to accurately and quickly test the electrical conductivity of a joint in an open wire line without materially affecting the mechanical strength or the electrical conductivity of the wire.

In accordance with one feature of this invention contact is first established at two points on the wire on each side of the joint under test. An initial reading of the resistance of that portion of the wire between each of these two points then indicates whether or not a good electrical contact has been obtained. After it has been made certain that a good contact has been obtained a reading of the resistance between the contacts on opposite sides of the joint indicates whether or not the joint under test is defective.

In accordance with another feature of this invention the amount of material which may be removed from the wire while insuring contact is limited so that neither the mechanical strength nor the electrical conductivity of the wire is appreciably affected.

A clearer conception of this invention may be had by reference to the accompanying drawing in which:

Fig. 1 is a front view of one embodiment of this invention having a portion broken away to more clearly show the arrangement of parts; Fig. 2 is a side view of the device of Fig. 1, and Fig. 3 is a cross-sectional view along the line 3—3 of Fig. 1.

Referring to the drawing a handle 10 of insulating material such as wood or bamboo, and which is long enough to reach from the ground to the line under observation is inserted into one end of a short metallic sleeve 11. This sleeve is secured to the handle by means of a metallic spring member 12, one end of which is bent to form a projection which passes into a suitable recess in handle 10 through a slot in sleeve 11. A U-shaped supporting member comprising a pair of flat metallic plates 13 and 14, the ends of which are sufficiently spaced to span the joint under test, is secured to the other end of sleeve 11. These plates which are riveted or otherwise secured to the opposite sides of the sleeve are held in spaced relation at the bottom by means of shouldered pins 15 and at the top by braces 16. A metallic brace 52 secured to sleeve 11 and to plate 14 serves to reinforce the mechanical connection between the U-shaped supporting member and the sleeve.

A contact arm comprising a pair of contact members or files 26 and 27 and a V-shaped hook member 18 which is preferably made from a phenol plastic compound such as bakelite and which is protected from mechanical injury by metallic plates 22 and 23 extends from one end of the U-shaped supporting member. As shown more clearly in Fig. 3 these contact members or files are attached to the opposite sides of the hook member 18 by the metallic supporting members 30 and 31 and are adapted to be moved in a vertical plane to remove any insulating scale from the surface of the wire, the portions 32 of the supporting members acting as guides.

A second contact arm extends from the opposite end of the U-shaped supporting member and comprises a pair of contact members or files 24 and 25 mounted by means of supporting members 28 and 29 on the opposite sides of a similar V-shaped hook member 17 which is protected from mechanical injury by a similar pair of metallic plates 20 and 21. Since the plates on the opposite sides of the hook members do not form a part of the electrical network they are set back from the extreme outer edge of the hook members as shown in Fig. 2 to prevent their making contact with the line wire when a test is being made. A lever 37 attached to shaft 39 which is journaled in plates 13 and 14 is adapted to be moved downward in a vertical plane when tension is applied to cord 41 attached to the extreme outer end of the lever. At the other contact arm a similar lever 38 is attached to shaft 40 and is adapted to be moved downward in a vertical plane when tension is applied to the cord 42 attached to its extreme outer end. A flat steel coil spring 43 is secured to shaft 39 and moves the lever upward in a vertical plane to restore it to its normal position after it has been displaced by tension applied to cord 41. A similar spring is attached to shaft 40 to restore the lever 38 to its normal position. Guard members 33 and 34 are securely attached to the sides of files 24 and 25 and similar guard members 35 and 36 are attached to the sides of files 26 and 27. As shown more clearly in Fig. 3 the files extend a slight distance beyond the face of the guard members which limit the depth of cut which the files may make when establishing contact with the line under observation. Metallic rods 44 and 45 serve as mechanical links between guard members 33 and 34 and lever 37. Similar metallic rods 46 and 47 serve as mechanical links between the guard members 35 and 36 and lever 38. Secured respectively to the supporting members 28, 29, 30 and 31 are terminals 48, 49, 50 and 51 to which the measuring apparatus may be conveniently connected.

In operation this device is associated with the line and is so positioned that the hook members 17 and 18 are on opposite sides of the joint under observation. A slight pull is exerted on handle 10 thus forcing the line wire between the files and the hook members. This in most instances is sufficient to establish good electrical contact between the files and the line. However, in order to make certain that good contact has been established a voltmeter and a suitable source of power, for example, a dry cell battery, are connected in series across terminals 48 and 49. If good contact has been established it will be visibly indicated on the meter. In the event that the meter indicates that a good contact has not been established the lever 37 is pulled downward by means of cord 41 thus moving file 24 upward and file 25 downward against the line wire thereby removing a small amount of material from the wire. The tension on the lever is then released and spring 43 forces the files back to their initial position. This operation is continued until the meter indicates that good contact has been established between the files and the line wire. The depth of cut which the files may make in the line wire when establishing this contact is limited to the distance that the files extend beyond the face of the guard members since the guard members merely slide up and down against the line wire when the files are moved as soon as this depth of cut has been reached. This construction prevents the files from removing an excess of material from the line so that neither the mechanical strength nor the electrical conductivity of the line is appreciably affected as the result of this operation. The same steps are then taken as regards the contact between the files 26 and 27 and the line on the opposite side of the joint under observation. After good contact has been established on both sides of the joint the meter and the source of testing current are then connected to terminals 49 and 50. A reading of the meter visibly indicates the resistance of the joint, thereby indicating whether or not the joint is defective.

What is claimed is:

1. A device for testing joints in a transmission line comprising a handle, a supporting member adapted to span the joint under test, a contact arm comprising a plurality of contact members mounted on each end of said supporting member and mechanically operated means associated with said contact members for causing relative movement between said contact members and said line for insuring contact therebetween whereby the resistance of the line between said members may be determined.

2. A device for testing joints in a transmission line comprising a supporting member adapted to span the joint under test, a contact arm comprising a plurality of contact members mounted on each end of said supporting member, mechanically operated means associated with each of said contact members for causing relative movement between said members and said line for making contact therebetween and means for limiting the amount of material removed from the line when making contact with said mechanically operated means.

3. A device for testing joints in a transmission line comprising a supporting member adapted to span the joint under test, a contact arm comprisig a plurality of contact members attached to each end of said supporting member, mechanically operated means for making contact between said contact members and the line, and means for preventing an excess of material from being removed from the line when establishing said contact.

4. A device for testing joints in a transmission line comprising a handle, a U-shaped supporting member mounted on one end of said handle and adapted to span the joint under test, a contact arm comprising a pair of files attached to each end of said supporting member, means for operating said files for making contact between the files and the line, and means for preventing an excess of material from being removed from the line when establishing said contact.

5. The method of determining the resistance of a joint in a transmission line which consists in establishing contact between two points on each side of the joint under observation, measuring the resistance between each of these two points to insure that good contact has been established and then measuring the resistance between the contacts on the opposite sides of the joint to determine the conductivity of the joint under test.

6. The method of determining the resistance of a joint in a transmission line which consists in removing material from the surface of the wire at a plurality of points on either side of the joint, establishing contact at two of said points on each side of the joint under test, measuring the resistance between each of these two points to insure that good contact has been established and then measuring the resistance between the contacts on the opposite sides of the joint to determine the conductivity of the joint under test.

7. A device for testing joints in a transmission line comprising a handle, a supporting member mounted on one end of said handle and adapted to span the joint under test, a contact arm comprising a pair of abrasive members associated with each end of said supporting member and mechanically operated means associated with each of said abrasive members for causing relative movement between said abrasive members and said line for insuring good contact therebetween.

8. A device for testing joints in a transmission line comprising a handle, a supporting member associated with one end of said handle and adapted to span the joint under test, a contact arm comprising a pair of files attached to each end of said supporting member and means for operating said files for insuring contact between said files and the line.

9. A device for testing joints in a transmission line comprising a handle, a supporting member associated with one end of said handle and adapted to span the joint under test, a contact arm comprising a pair of files attached to each end of said supporting member and means comprising a lever and a spring associated with each pair of files for causing relative movement between said files and the line to insure good contact therebetween.

In witness whereof, we hereunto subscribe our names this 20th day of November, 1928.

JOHN B. DIXON.
EDWARD M. HONAN.